(12) United States Patent
Cho et al.

(10) Patent No.: US 8,796,373 B1
(45) Date of Patent: Aug. 5, 2014

(54) NON-CROSSLINKED POLYETHYLENE COMPOSITION FOR POWER CABLE

(71) Applicants: SK Innovation Co., Ltd., Seoul (KR); SK Global Chemical Co., Ltd., Seoul (KR)

(72) Inventors: Gyuchan Cho, Daejeon (KR); Kwanghoi Ku, Daejeon (KR); Jaesoon Lee, Daejeon (KR); Kyucheol Cho, Daejeon (KR)

(73) Assignees: SK Innovation Co., Ltd., Seoul (KR); SK Global Chemical Co., Ltd., Seoul (KR)

(*) Notice: Subject to any disclaimer, the term of this patent is extended or adjusted under 35 U.S.C. 154(b) by 0 days.

(21) Appl. No.: 14/173,401

(22) Filed: Feb. 5, 2014

(30) Foreign Application Priority Data

Feb. 6, 2013 (KR) .................. 10-2013-0013466

(51) Int. Cl.
*C08K 3/22* (2006.01)
*H01B 3/44* (2006.01)
*H01B 9/00* (2006.01)
*C08L 23/08* (2006.01)

(52) U.S. Cl.
CPC ........................... *H01B 3/441* (2013.01)
USPC ........... 524/414; 524/432; 524/433; 525/240; 174/110 PM

(58) Field of Classification Search
CPC ............ H01B 9/00; H01B 3/411; C08K 3/22
USPC .......................... 524/414, 432, 433; 525/240; 174/110 PM
See application file for complete search history.

(56) References Cited

U.S. PATENT DOCUMENTS

| 4,426,497 A | 1/1984 | Kent |
| 6,130,385 A * | 10/2000 | Tuunanen et al. ..... 174/110 PM |
| 6,284,178 B1 | 9/2001 | Russell et al. |
| 7,221,833 B2 * | 5/2007 | Park et al. .................... 385/106 |
| 8,703,288 B2 * | 4/2014 | Clancy ........................ 428/379 |
| 2013/0253128 A1* | 9/2013 | Lee et al. .................... 524/579 |

FOREIGN PATENT DOCUMENTS

| JP | 2004131615 A | * | 4/2004 |
| JP | 2008063562 A | * | 3/2008 |
| KR | 1020040083665 | | 10/2004 |
| KR | 1020100106871 | | 10/2010 |
| WO | WO 9305424 A1 | * | 3/1993 |

OTHER PUBLICATIONS

Machine translated English equivalent of JP 2008-063562 (Mar. 2008, 13 pages).*
Machine translated English equivalent of JP 2004-13165 (Apr. 2004, 16 pages).*

* cited by examiner

*Primary Examiner* — Brieann R Fink
(74) *Attorney, Agent, or Firm* — Lowe Hauptman & Ham, LLP

(57) ABSTRACT

Provided is a polymer composition usable as a covering material of a power cable for outdoors, and more particularly, a non-crosslinked polyethylene composition for a power cable using a non-crosslinked type polyethylene resin instead of using a crosslinked polyethylene which is widely used around the world as the existing power cable insulator. The power cable using a covering material made of the polymer composition according to the present disclosure may have excellent tracking resistance to be appropriately used in costal areas containing large salts, industrial complexes containing large pollutants, and the like.

10 Claims, No Drawings

— NON-CROSSLINKED POLYETHYLENE COMPOSITION FOR POWER CABLE

CROSS-REFERENCE TO RELATED APPLICATIONS

This application claims priority under 35 U.S.C. §119 to Korean Patent Application No. 10-2013-0013466, filed on Feb. 6, 2013, in the Korean Intellectual Property Office, the disclosure of which is incorporated herein by reference in its entirety.

TECHNICAL FIELD

The following disclosure relates to a polymer composition usable as a covering material of a power cable for outdoors, and more particularly, to a non-crosslinked polyethylene composition for a power cable using a non-crosslinked type polyethylene resin instead of using crosslinked polyethylene which is widely used around the world as the existing power cable insulator. The power cable using the covering material made of the polymer composition according to the present disclosure may have excellent tracking resistance to be appropriately used in costal areas containing large salts, industrial complexes containing large pollutants, and the like.

BACKGROUND

A crosslinked polyethylene resin currently and mainly used as an insulating material of a power cable is a thermosetting resin to have not only excellent heat resistance, chemical resistance, and the like, but also excellent electric property. A scheme of crosslinking polyethylene includes a cross-linkage by a chemical reaction using an organic peroxide or silane as a mediator (U.S. Pat. No. 6,284,178 (Sep. 4, 2011), a radiation cross-linkage (U.S. Pat. No. 4,426,497 (Jan. 17, 1984), and the like, and recently, a crosslinked polyethylene resin using organic peroxide has been the most widely used in cable industries.

However, since the crosslinked polyethylene resin is a thermosetting resin, it is not recyclable to have difficulty in disposal, causing environmental pollution. Therefore, a non-crosslinked thermoplastic polyethylene resin which is environmentally friendly is required to be used; however, heat resistance is remarkably unsufficient, as compared to the crosslinked polyethylene resin, such that the non-crosslinked thermoplastic polyethylene resin has a limitation in being used as an insulator for a power cable.

A cross-linkage process is necessary for a process producing a power cable of crosslinked polyethylene using an organic peroxide, wherein in the cross-linkage process, high pressure and high temperature are required to be performed, productivity is remarkably decreased, and a difference in a degree of cross-linkage may occur by even small changes in processing conditions, such that uniformity of a product may be decreased.

In addition, during the cross-linkage process, an organic peroxide is decomposited by high temperature heat to produce radicals, thereby completing the cross-linkage reaction, wherein cumyl alcohol, methane, and the like, are generated as by-product of the cross-linkage reaction, to form bubbles in the insulator. To remove the bubbles, high pressure of 5 atm or more should be applied, and non-removed bubbles may be a material causing breakage of the insulator for a power cable.

Regarding this, Korean Patent Laid-Open Publication No. KR 10-2010-0106871 (Oct. 4, 2010) discloses a non-crosslinked polyethylene resin as an insulating material for a power cable; however, has a problem in that at the time of performing an actual process, processability is defective due to low shear thining of the resin, such that processability defect occurs. In addition, tracking resistance is defective, thereby causing a problem in that performance as an insulator of a cable for outdoors is deteriorated.

In order to solve the problem, a metal hydroxide is applied to the existing insulating resin composition (Korean Patent No. 10-0556318); however, the metal hydroxide is contained in a content of 10 to 30 parts by weight, thereby causing the following problems.

The metal hydroxide has poor compatibility with polyethylene, thereby having defective mechanical physical properties such as tensile strength, elongation retention, and the like. In addition, the metal hydroxide increases a density of a covering material of a cable, thereby causing a problem that the cable is slack due to the increased weight of the cable at the time of being installed, whereby life span becomes decreased or a distance between pylons should be decreased. Further, environmental durability may be deteriorated and pollutants may occur on a surface due to the metal hydroxide. Accordingly, hydrophilic property is increased to generate a leakage current due to moisture accumulation, such that a possibility of a tracking phenomenon due to an arc generation may be increased to deteriorate a long-term reliability.

RELATED ART DOCUMENT

Patent Document

U.S. Pat. No. 6,284,178 (Sep. 4, 2011)
U.S. Pat. No. 4,426,497 (Jan. 17, 1984)
Korean Patent Laid-Open Publication No. 10-2010-0106871 (Oct. 4, 2010)
Korean Patent No. 10-0556318 (Mar. 3, 2006)

SUMMARY

An embodiment of the present disclosure is directed to providing a non-crosslinked type polyethylene resin composition for a power cable capable of not being crosslinked to be reusable, being environmentally friendly and overcoming insufficient processability which is a disadvantage of the existing crosslinked polyethylene resin.

In addition, another embodiment of the present disclosure is directed to providing a resin composition having a long-term reliability capable of providing a cable having tracking resistance and excellent mechanical property, environmental durability and low density, and a cable using the same.

In one general aspect, a non-crosslinked polyethylene composition for a power cable includes: based on 100 parts by weight of a base resin containing a middle-density polyethylene resin and a linear low-density polyethylene resin, 3 to 10 parts by weight of a metal hydroxide; 0.5 to 5 parts by weight of a red phosphorus; and 1 to 5 parts by weight of carbon black.

In another general aspect, a non-crosslinked polyethylene composition for a power cable includes: based on 100 parts by weight of a base resin containing a middle-density polyethylene resin and a linear low-density polyethylene resin, 3 to 10 parts by weight of a metal hydroxide, 0.5 to 5 parts by weight of a red phosphorus; 1 to 5 parts by weight of carbon black, and 1 to 5 parts by weight of any one or more additives selected from an oxidation stabilizer a UV stabilizer, a processing aid.

In another general aspect, a power cable using the non-crosslinked polyethylene composition as described above is provided.

DETAILED DESCRIPTION OF EMBODIMENTS

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of example embodiments. As used herein, the singular forms "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a resin composition having tracking resistance according to the present disclosure and a cable using the same will be described in detail.

The present inventors studied a composition having excellent tracking resistance and mechanical property using a non-crosslinked polyethylene resin and found that as a solution for suppressing a tracking phenomenon caused by an endothermic reaction and moisture resulted from decomposition of a metal hydroxide according to the prior art, a red phosphorus is used to form Char, such that a non-insulating layer may be formed on a surface to physically prevent a heat transfer into a polymer resin and a fuel supply to a combustion region on the surface, whereby a tracking phenomenon may be remarkably decreased, thereby completing the present disclosure.

In addition, the present inventors found that a red phosphorus is used to decrease a content of the metal hydroxide, such that surface pollutants due to the metal hydroxide may be decreased and a density of a covering material of a cable may be decreased to thereby obtain a relatively light cable, and the obtained cable may secure a long-term reliability, thereby completing the present disclosure.

A non-crosslinked polyethylene composition for a power cable according to an embodiment of the present disclosure includes: based on 100 parts by weight of a base resin containing a middle-density polyethylene resin and a linear low-density polyethylene resin, 3 to 10 parts by weight of a metal hydroxide, 0.5 to 5 parts by weight of a red phosphorus, and 1 to 5 parts by weight of carbon black.

In addition, the non-crosslinked polyethylene composition for a power cable according to an embodiment of the present disclosure includes: based on 100 parts by weight of a base resin containing a middle-density polyethylene resin and a linear low-density polyethylene resin, 3 to 10 parts by weight of a metal hydroxide, 0.5 to 5 parts by weight of a red phosphorus; 1 to 5 parts by weight of carbon black, and 1 to 5 parts by weight of any one or more additives selected from an oxidation stabilizer, UV stabilizer, a processing aid.

Hereinafter, each configuration of the present disclosure will be described in detail.

The middle-density polyethylene resin may have a melt index of 0.5 to 2.2 g/10 min (190° C., under a load of 2.16 Kg), a molecular weight distribution of 2 to 5 and a density of 0.925 to 0.945 g/cm$^3$. In the case in which the melt index is less than 0.5 g/10 min, productivity in a cable manufacturing process may be decreased to deteriorate an economical efficiency, and in the case in which the melt index having more than 2.2 g/10 min is applied to the power cable, basic physical properties may be deteriorated. In addition, in the case in which the molecular weight distribution is less than 2, melt fracture may occur on a surface at the time of manufacturing a power cable, and in the case in which the molecular weight distribution is more than 5, polyethylene polymerization may be difficult to be performed. More preferably, the molecular weight distribution may be 2.5 to 3.5 due to easiness of the resin synthesis process and excellent processability in the power cable of the resin. In addition, in the case in which the density is less than 0.925 g/cm$^3$, the thus-manufactured cable is fragile, which is difficult to provide a sufficient hardness, and in the case in which the density is more than 0.945 g/cm$^3$, the cable is stiff, which is difficult to be used.

More preferably, the middle-density polyethylene resin may be a linear polyethylene resin including an α-olefin having four or more carbon atoms as a comonomer. The α-olefin having four or more carbon atoms may be selected from butene, pentene, methyl pentene, hexene, octene or decene.

The polyethylene resin includes α-olefin so that α-olefins are abundantly coupled on a carbon main chain, thereby increasing an efficiency of a tie molecule strongly connecting a resin crystal portion and an amorphous portion, whereby a long-term heat resistance and electrical properties may be improved.

The base resin according to the present disclosure is prepared by mixing 50 to 90 wt % of the middle-density polyethylene resin and 10 to 50 wt % of the linear low-density polyethylene resin. The thus-prepared mixture may provide relatively excellent processability and an alternating current (AC) insulation breakdown performance. Here, the mixture containing 50 to 90 wt % of the middle-density polyethylene resin and 10 to 50 wt % of the linear low-density polyethylene resin is preferred since the mixture achieves relatively excellent processability and an AC insulation breakdown performance. In the case in which the content of the middle-density polyethylene resin is less than 50 wt % and the content of the linear low-density polyethylene resin is more than 50 parts by weight, mechanical properties may be deteriorated, and in the case in which the content of the middle-density polyethylene resin is more than 90 wt % and the content of the linear low-density polyethylene resin is less than 10 parts by weight, processability and an AC insulation breakdown performance may not be sufficient.

In the present disclosure, the linear low-density polyethylene resin has a density of 0.925 or less, which indicates a polyethylene generally referring to as LLDPE.

The linear low-density polyethylene resin may have a melt index (MI) of 0.3 to 10 g/10 min (190° C., under a load of 2.16 Kg), a molecular weight distribution of 2 to 6, and a density of 0.910 to 0.925 g/cm$^3$. In the case in which the MI is less than 0.3 g/10 min, processability in the existing processing equipment is difficult to be performed and productivity is deteriorated. In the case in which the MI is more than 10 g/10 min, processability and an AC insulation breakdown performance may not be sufficient In addition, in the case in which the molecular weight distribution is less than 2, processability is deteriorated, and in the case in which the molecular weight distribution is more than 6, a long-term heat resistance may be deteriorated. More preferably, in the case in which the molecular weight distribution is 2.5 to 4.5, a long-term heat resistance may be excellent. In addition, in the case in which the density is less than 0.910 g/cm$^3$, the thus-manufactured cable is fragile, which is difficult to provide a sufficient hardness, and in the case in which the density is more than 0.925 g/cm$^3$, the cable is stiff, which is difficult to be used.

In the present disclosure, the molecular weight distribution and the density of the middle-density polyethylene resin and the linear low-density polyethylene resin may show a unimodal or a bimodal shape.

In the composition according to the present disclosure, the metal hydroxide used in order to provide tracking resistance may be prepared by using aluminum hydroxide, magnesium hydroxide, zinc hydroxide, and the like, alone or a mixture of two or more thereof. The metal hydroxide provides tracking resistance due to block of inflammable gas and fuel dilution by cooling and vapor generated from dehydration reaction. The metal hydroxide may be surface-treated with a polymer resin such as silane or may not be surface-treated. In the case in which the metal hydroxide is surface-treated with silane, compatibility between a polymer resin and an additive may be increased, such that mechanical properties after performing a mixing process may be improved. The metal hydroxide may be used in a content of 3 to 10 parts by weight, more preferably, 3 to 7 parts by weight, based on 100 parts by weight of the base resin. In the case in which the content of the metal hydroxide is less than 3 parts by weight, tracking resistance may not be sufficient, and in the case in which the content of the metal hydroxide is more than 10 parts by weight, mechanical physical property and environmental durability may be rapidly deteriorated, and weight of the covering material for a cable may be increased, such that a distance between pyrons should be decreased, a structure of the cable may be strengthen during cable installation.

The composition according to the present disclosure contains a red phosphorus in order to provide tracking resistance, in addition to the metal hydroxide. The red phosphorus, which is to block oxygen and to hinder an expansion of flame due to Char formed by dehydration and carbonization reactions, thereby providing tracking resistance, may provide excellent tracking resistance even with a small content together by using the metal hydroxide. The red phosphorus may contain phosphorus in a content of 70% or more, and the remaining red phosphorus may be surface-treated with synthetic resins such as a urethane-based resin, a melamine-based resin, and a phenol-based resin, and may have an average particle size of 5 to 50 μm. In the case in which the phosphorus has a content of less than 70 wt %, tracking resistance may not be sufficient, and in the case in which the average particle size is less than 5 μm, at the time of mixing an insulating material, compatibility with a resin may be deteriorated and it is difficult to be handled, and in the case in which the average particle size is more than 50 μm, dispersibility may be deteriorated. The red phosphorus may be used in a content of 0.5 to 5 parts by weight, more preferably, 1 to 2 parts by weight, based on 100 parts by weight of the base resin. In the case in which the red phosphorus has a content of less than 0.5 parts by weight, tracking resistance may not be sufficient, and in the case in which the red phosphorus has a content of more than 5 parts by weight, mechanical physical property may be deteriorated and the cable has a rough appearance.

The composition of the present disclosure may contain carbon black in order to improve degradation resistance of a polymer against ultraviolet rays, wherein the carbon black may be contained in 1 to 5 parts by weight, based on 100 parts by weight of the base resin. In the case in which the content of the carbon black is less than 1 part by weight, a desired effect may not be achieved, and in the case in which the content of the carbon black is more than 5 parts by weight, tracking resistance may be decreased and mechanical physical property may be deteriorated. As the carbon black, general carbon blacks such as furnace black, acetylene black, thermal black, and the like, may be used. In addition, the carbon black may have a particle size of 10 to 30 nm and a surface area of 100 to 200 m$^2$/g to achieve excellent degradation resistance.

The composition of the present disclosure may further contain any one or more additives selected from an oxidation stabilizer, UV stabilizer, a processing aid, wherein the additive may be contained in a content of 0.1 to 20 parts by weight, and more preferably, 0.1 to 8 parts by weight. Based on 100 parts by weight of the base resin, in the case in which the content of the additive is less than 0.1 parts by weight, deterioration of the polymer may be accelerated after using the polymer for 20,000 hours or more, and in the case in which the content of the additive is more than 20 parts by weight, mechanical physical property of the polyethylene resin may be deteriorated.

The oxidation stabilizer and the UV stabilizer are used to improve long-term creep property during transportation, storage and use of a power cable, and more specifically, the oxidation stabilizer and the UV stabilizer may be selected from a group consisting of hindered phenols, phosphates, benzophenones, hindered amine light stabilizers (HALS) and thioesters.

In addition, the processing aid improves heat resistance and decreases a processing load, and more specifically, the processing aid may be selected from a group consisting of a fluorocarbon elastomer and a fluoroolefin copolymer compound.

The present disclosure provides a power cable using the non-crosslinked polyethylene composition for a power cable according to the present disclosure, wherein the power cable may be applied to an insulating layer, a semi-conductive layer or a sheath layer.

Hereinafter, although exemplary embodiments of the present disclosure have been disclosed for illustrative purposes, the present disclosure is not limited to the following description.

Hereinafter, physical properties in accordance with Examples of the present disclosure were evaluated by the following measurements.

1) Tensile Strength and Elongation

Tensile strength and elongation of samples were measured by a mechanical property test (ASTM D638) at room temperature (25° C.).

Elongation was calculated by the following Equation.

Elongation (%)=(Marking Distance After Tension−Marking Distance Before Tension)/Marking Distance Before Tension×100

2) Heat Resistance Property

After a sample (ASTM D638 Type IV) was prepared and left in a convection oven at 121° C. for 168 hours and taken out from the oven and left at 25° C. for 4 hours. Then, within 10 hours, tensile strength (fracture) and elongation were measured by ASTM D638, and the measured tensile strength and elongation values were divided into the original values thereof before putting the sample in the oven, thereby obtaining each tensile strength retention (%) and elongation retention (%) by the following Equations:

Tensile Strength Retention (%)=Tensile Strength After Treatment/Tensile Strength Before Treatment×100

Elongation Retention (%)=Elongation Retention After Treatment/Elongation Retention Before Treatment×100

3) Tracking Resistance

In order to test tracking resistance of test specimen in accordance with IEC 60587, first, 0.1% ammonium chloride and 0.02% surfactant were mixed into a distilled water to prepare a contaminant solution. Then, while flowing the contaminant solution at a rate of 0.6 mL/min on a surface of the test specimen, a voltage of 4.5 kV was applied thereon, and time (min) required for observing tracking phenomenon was evaluated.

Example 1

As a middle-density polyethylene resin, a resin having a density of 0.934 g/cm$^3$, a melt index of 0.64 g/10 min(190° C., under a load of 2.16 Kg) and a molecular weight distribution of 3.5 and including an α-olefin having 8 carbon atoms as a comonomer was used.

As a linear low-density polyethylene resin, a resin having a density of 0.918 g/cm$^3$, a melt index of 2.0 g/10 min(190° C., under a load of 2.16 Kg) and a molecular weight distribution of 2 was used.

As a base resin, 70 wt % of the middle-density polyethylene resin and 30 wt % of the linear low-density polyethylene resin were mixed to be used.

Based on 100 parts by weight of the base resin, 5 parts by weight of magnesium hydroxide (average particle size of 3.4 μm), 1 parts by weight of a red phosphorus (phosphorus content of 90%, average particle size of 25 μm), 2 parts by weight of furnace black among carbon blacks (average particle size of 20 nm), and 1.6 parts by weight of oxidation stabilizer were compounded to prepare a composition for a power cable.

As the oxidation stabilizer, 1.2 parts by weight of Irganox1010 (Ciba-Geigy), 0.1 parts by weight of Irganox168 (Ciba-Geigy) and 0.3 parts by weight of Vanox ZMTI (Vanderbilt) were used.

A Twin Screw extruder having 30Φ, L/D=37 was used to compound the composition. After the composition was mixed at a temperature of about 210, the composition was prepared in a sheet type and then press-molded at 190 for 10 minutes and cooled using a press in an electric heating scheme, thereby preparing a sample for testing mechanical properties and tracking resistance properties.

Physical properties of the prepared sample were shown in the following Table 2.

Example 2

A sample of Example 2 was prepared by the same method as Example 1 above except for using 1.5 parts by weight of a red phosphorus.

Physical properties of the prepared sample were shown in the following Table 2.

Example 3

A sample of Example 3 was prepared by the same method as Example 1 above except for using 60 wt % of a middle-density polyethylene resin and 40 wt % of a linear low-density polyethylene resin as a base resin.

Physical properties of the prepared sample were shown in the following Table 2.

Example 4

A sample of Example 4 was prepared by the same method as Example 1 above except for using 60 wt % of a middle-density polyethylene resin and 40 wt % of a linear low-density polyethylene resin as a base resin, and using 1.5 parts by weight of a red phosphorus.

Physical properties of the prepared sample were shown in the following Table 2.

Example 5

A sample of Example 5 was prepared by the same method as Example 1 above except for using 5 parts by weight of a red phosphorus.

Physical properties of the prepared sample were shown in the following Table 2.

Example 6

A sample of Example 6 was prepared by the same method as Example 1 above except for using 3 parts by weight of magnesium hydroxide.

Physical properties of the prepared sample were shown in the following Table 2.

Example 7

A sample of Example 7 was prepared by the same method as Example 1 above except for using 10 parts by weight of magnesium hydroxide.

Physical properties of the prepared sample were shown in the following Table 2.

Example 8

A sample of Example 8 was prepared by the same method as Example 1 above except for using 1 parts by weight of carbon black.

Physical properties of the prepared sample were shown in the following Table 2.

Example 9

A sample of Example 9 was prepared by the same method as Example 1 above except for using 5 parts by weight of carbon black.

Physical properties of the prepared sample were shown in the following Table 2.

Example 10

A sample of Example 10 was prepared by the same method as Example 1 above except for using 50 wt % of a middle-density polyethylene resin and 50 wt % of a linear low-density polyethylene resin as a base resin.

Physical properties of the prepared sample were shown in the following Table 2.

Example 11

A sample of Example 11 was prepared by the same method as Example 1 above except for using 90 wt % of a middle-density polyethylene resin and 10 wt % of a linear low-density polyethylene resin as a base resin.

Physical properties of the prepared sample were shown in the following Table 2.

Comparative Example 1

A sample of Comparative Example 1 was prepared by the same method as Example 1 above except for not using magnesium hydroxide and red phosphorus, as shown in the following Table 1.

Physical properties of the prepared sample were shown in the following Table 2.

Comparative Example 2

A sample of Comparative Example 2 was prepared by the same method as Example 1 above except for not using a red phosphorus, as shown in the following Table 1.
Physical properties of the prepared sample were shown in the following Table 2.

Comparative Example 3

A sample of Comparative Example 3 was prepared by the same method as Example 1 above except for using 0.4 parts by weight of a red phosphorus.
Physical properties of the prepared sample were shown in the following Table 2.

Comparative Example 4

A sample of Comparative Example 4 was prepared by the same method as Example 1 above except for using 6 parts by weight of a red phosphorus.
Physical properties of the prepared sample were shown in the following Table 2.

Comparative Example 5

A sample of Comparative Example 5 was prepared by the same method as Example 1 above except for using 2 parts by weight of magnesium hydroxide.
Physical properties of the prepared sample were shown in the following Table 2.

Comparative Example 6

A sample of Comparative Example 6 was prepared by the same method as Example 1 above except for using 11 parts by weight of magnesium hydroxide.
Physical properties of the prepared sample were shown in the following Table 2.

Comparative Example 7

A sample of Comparative Example 7 was prepared by the same method as Example 1 above except for using 0.5 parts by weight of carbon black.
Physical properties of the prepared sample were shown in the following Table 2.

Comparative Example 8

A sample of Comparative Example 8 was prepared by the same method as Example 1 above except for using 6 parts by weight of carbon black.
Physical properties of the prepared sample were shown in the following Table 2.

Comparative Example 9

A sample of Comparative Example 9 was prepared by the same method as Example 1 above except for using 95 wt % of a middle-density polyethylene resin and 5 wt % of a linear low-density polyethylene resin as a base resin.
Physical properties of the prepared sample were shown in the following Table 2.

TABLE 1

|  | Base Resin (100 Parts by Weight) | | Magnesium Hydroxide (Parts by Weight) | Red Phosphorus (Parts by Weight) | Carbon Black (Parts by Weight) | Oxidation Stabilizer 1 (Parts by Weight) | Oxidation Stabilizer 2 (Parts by Weight) | Oxidation Stabilizer 3 (Parts by Weight) |
|---|---|---|---|---|---|---|---|---|
|  | MDPE (WT %) | LLDPE (WT %) | | | | | | |
| Example 1 | 70 | 30 | 5 | 1 | 2 | 1.2 | 0.1 | 0.3 |
| Example 2 | 70 | 30 | 5 | 1.5 | 2 | 1.2 | 0.1 | 0.3 |
| Example 3 | 60 | 40 | 5 | 1 | 2 | 1.2 | 0.1 | 0.3 |
| Example 4 | 60 | 40 | 5 | 1.5 | 2 | 1.2 | 0.1 | 0.3 |
| Example 5 | 70 | 30 | 5 | 5 | 2 | 1.2 | 0.1 | 0.3 |
| Example 6 | 70 | 30 | 3 | 1 | 2 | 1.2 | 0.1 | 0.3 |
| Example 7 | 70 | 30 | 10 | 1 | 2 | 1.2 | 0.1 | 0.3 |
| Example 8 | 70 | 30 | 5 | 1 | 1 | 1.2 | 0.1 | 0.3 |
| Example 9 | 70 | 30 | 5 | 1 | 5 | 1.2 | 0.1 | 0.3 |
| Example 10 | 50 | 50 | 5 | 1 | 2 | 1.2 | 0.1 | 0.3 |
| Example 11 | 90 | 10 | 5 | 1 | 2 | 1.2 | 0.1 | 0.3 |
| Comparative Example 1 | 70 | 30 | — | — | 2 | 1.2 | 0.1 | 0.3 |
| Comparative Example 2 | 70 | 30 | 5 | — | 2 | 1.2 | 0.1 | 0.3 |
| Comparative Example 3 | 70 | 30 | 5 | 0.4 | 2 | 1.2 | 0.1 | 0.3 |
| Comparative Example 4 | 70 | 30 | 5 | 6 | 2 | 1.2 | 0.1 | 0.3 |
| Comparative Example 5 | 70 | 30 | 2 | 1 | 2 | 1.2 | 0.1 | 0.3 |
| Comparative Example 6 | 70 | 30 | 11 | 1 | 2 | 1.2 | 0.1 | 0.3 |
| Comparative Example 7 | 70 | 30 | 5 | 1 | 0.5 | 1.2 | 0.1 | 0.3 |
| Comparative Example 8 | 70 | 30 | 5 | 1 | 6 | 1.2 | 0.1 | 0.3 |
| Comparative Example 9 | 95 | 5 | 5 | 1 | 2 | 1.2 | 0.1 | 0.3 |

TABLE 2

| | Heat Resistance Properties | | Tensile Strength (kgf/cm²) | Elongation (%) | Tracking Resistance (Min) |
|---|---|---|---|---|---|
| | Tensile strength retention (%) | Elongation Retention (%) | | | |
| Example 1 | 76 | 113 | 263 | 618 | 145 |
| Example 2 | 89 | 115 | 246 | 598 | 271 |
| Example 3 | 88 | 116 | 353 | 753 | 267 |
| Example 4 | 88 | 123 | 283 | 668 | 222 |
| Example 5 | 83 | 94 | 232 | 485 | 301 |
| Example 6 | 92 | 120 | 373 | 802 | 190 |
| Example 7 | 79 | 103 | 256 | 581 | 289 |
| Example 8 | 87 | 122 | 289 | 627 | 281 |
| Example 9 | 83 | 112 | 235 | 784 | 151 |
| Example 10 | 78 | 103 | 221 | 674 | 210 |
| Example 11 | 91 | 121 | 380 | 820 | 198 |
| Comparative Example 1 | 94 | 101 | 393 | 948 | 28 |
| Comparative Example 2 | 98 | 98 | 385 | 918 | 92 |
| Comparative Example 3 | 89 | 117 | 392 | 892 | 124 |
| Comparative Example 4 | 78 | 81 | 120 | 432 | 350 |
| Comparative Example 5 | 81 | 105 | 298 | 745 | 101 |
| Comparative Example 6 | 73 | 79 | 119 | 413 | 278 |
| Comparative Example 7 | 89 | 102 | 206 | 690 | 136 |
| Comparative Example 8 | 79 | 110 | 248 | 614 | 107 |
| Comparative Example 9 | 95 | 109 | 391 | 914 | 150 |

It could be appreciated from Table 2 above that samples of Examples according to the present disclosure had remarkably increased tracking resistance as compared to samples of Comparative Examples not containing magnesium hydroxide or red phosphorus.

It could be appreciated that the sample of Comparative Example 1 did not contain magnesium hydroxide and red phosphorus, the sample of Comparative Example 2 did not contain red phosphorus, the sample of Comparative Example 3 contains less red phosphorus, the sample of Comparative Example 5 contains less magnesium hydroxide, and the samples of Comparative Examples 7 and 8 contain an insufficient or excessive content of carbon black, such that the tracking resistance was significantly deteriorated in the samples of Comparative Examples.

In addition, it could be appreciated that the sample of Comparative Example 4 contains an excessive content of red phosphorus, and the sample of Comparative Example 6 contains an excessive content of magnesium hydroxide, such that tensile strength and elongation retention in the samples of Comparative Examples were significantly deteriorated.

It could be appreciated from the sample of Comparative Example 9 that tensile property, heat-resistance, and tracking resistance were excellent; however, due to an excessive content of MDPE, at the time of compounding, abnormal torque occurred in the extruder, such that a mixing process was not easily performed, and the prepared material had deteriorated flexibility, which was not appropriate as a material for a cable.

Since the non-crosslinked polyethylene composition for a power cable according to the present disclosure uses the thermoplastic polyethylene resin which is not crosslinked to be reusable, the existing crosslinking process may be omitted at the time of manufacturing the cable, such that the processability may be excellent, the manufacturing cost may be remarkably decreased, and the tracking resistance and the mechanical property may be excellent, thereby making it possible to be used as a covering material of a power cable for outdoors.

What is claimed is:

1. A non-crosslinked polyethylene composition for a power cable comprising:
    based on 100 parts by weight of a base resin containing a middle-density polyethylene resin and a linear low-density polyethylene resin,
    3 to 10 parts by weight of a metal hydroxide;
    0.5 to 5 parts by weight of a red phosphorus; and
    1 to 5 parts by weight of carbon black,
    wherein the base resin is prepared by mixing 50 to 90 wt % of the middle-density polyethylene resin and 10 to 50 wt % of the linear low density polyethylene resin.

2. The non-crosslinked polyethylene composition for a power cable of claim 1, wherein the middle-density polyethylene resin has a melt index of 0.5 to 2.2 g/10 min (190° C., under a load of 2.16 Kg), a molecular weight distribution of 2 to 5 and a density of 0.925 to 0.945 g/cm³.

3. The non-crosslinked polyethylene composition for a power cable of claim 1, wherein the middle-density polyethylene resin is a linear polyethylene resin including an α-olefin having four or more carbon atoms as a comonomer.

4. The non-crosslinked polyethylene composition for a power cable of claim 3, wherein the α-olefin having four or more carbon atoms is selected from butene, pentene, methyl pentene, hexene, octene or decene.

5. The non-crosslinked polyethylene composition for a power cable of claim 1, wherein the linear low-density polyethylene resin has a melt index of 0.3 to 10 g/10 min (190° C., under a load of 2.16 Kg), a molecular weight distribution of 2 to 6 and a density of 0.910 to 0.925 g/cm³.

6. The non-crosslinked polyethylene composition for a power cable of claim 1, wherein the metal hydroxide is at least one hydroxide selected from aluminum hydroxide, magnesium hydroxide, zinc hydroxide or mixtures thereof.

7. The non-crosslinked polyethylene composition for a power cable of claim 1, wherein the red phosphorus contains phosphorus in a content of 70% or more and has an average particle size of 5 to 50 μm.

8. The non-crosslinked polyethylene composition for a power cable of claim 1, wherein the carbon black is at least one carbon selected from furnace black, acetylene black, thermal black, or mixtures thereof.

9. The non-crosslinked polyethylene composition for a power cable of claim 1, further comprising 1 to 5 parts by weight of at least one additive selected from an oxidation stabilizer, a UV stabilizer, or a processing aid.

10. A power cable using the non-crosslinked polyethylene composition of claim 1.

* * * * *